Dec. 27, 1966    R. H. APPELDORN    3,293,982
OVERHEAD PROJECTOR WITH AN UNSYMMETRICAL
REFLECTIVE SUPPORTING STAGE
Filed Sept. 28, 1964    2 Sheets-Sheet 1

INVENTOR.
ROGER H. APPELDORN
BY
Carpenter, Abbott, Coulter & Kinney
ATTORNEYS

INVENTOR.
ROGER H. APPELDORN
BY
Carpenter, Abbott, Coulter & Kinney
ATTORNEYS

United States Patent Office 3,293,982
Patented Dec. 27, 1966

3,293,982
OVERHEAD PROJECTOR WITH AN UNSYMMETRICAL REFLECTIVE SUPPORTING STAGE
Roger H. Appeldorn, White Bear Lake, Minn., assignor to Minnesota Mining and Manufacturing Company, St. Paul, Minn., a corporation of Delaware
Filed Sept. 28, 1964, Ser. No. 399,651
13 Claims. (Cl. 88—24)

This invention relates to the projection of light patterns. In one important aspect the invention provides novel apparatus in the form of a greatly simplified overhead projector. While not limited thereto, the invention will for convenience be described primarily in terms of overhead projector apparatus with which images may be projected on a nearby vertical screen or wall from a relatively large transparency resting on a horizontal stage.

The overhead projector of the present invention is capable of producing a projected image of substantially uniform high light intensity and with surprisingly high contrast and accurate color rendition. At the same time the size, complexity and cost of the apparatus are reduced, when compared with prior projectors capable of projecting images of similar dimensions and from similar transparencies. The simplified construction affords increased protection to the transparency and results in no distinguishable loss of detail in the projected image.

These and other advances and advantages are attained by supporting the transparency of which a projection is desired on an unsymmetrical reflective supporting stage, directing a beam of light through the transparency and to the reflective surface, and reflecting the beam through the transparency and to a focusing projection head from whence it is directed to, and focused on, the viewing screen, all as will be further described and illustrated. In a particularly preferred embodiment the light source and the projection head are enclosed within a common housing, closely adjacent each other and on opposite sides of the axis of a segmented incremental reflector comprising a planar arrangement of concentric conoidal specularly reflective surfaces of increasing diameter and inclination, and wherein said axis is offset from the center of the transparency-supporting stage.

Figure 1:
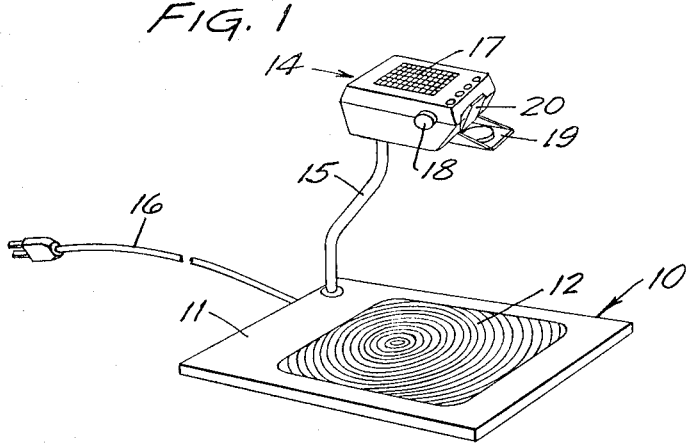
Figure 2:
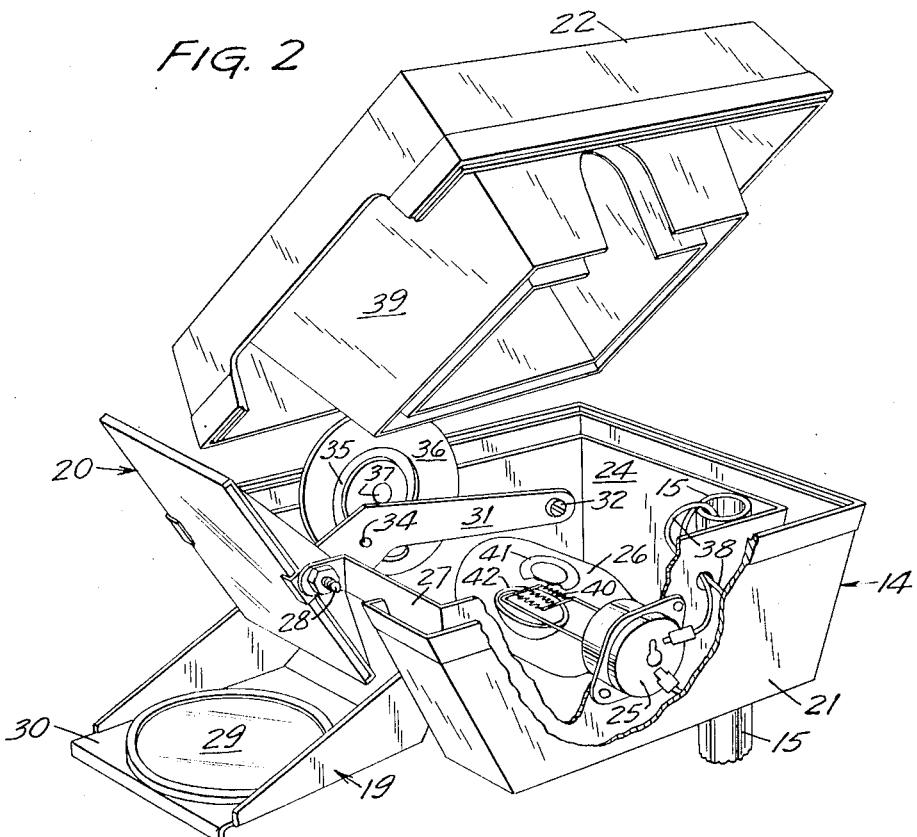
Figure 3:
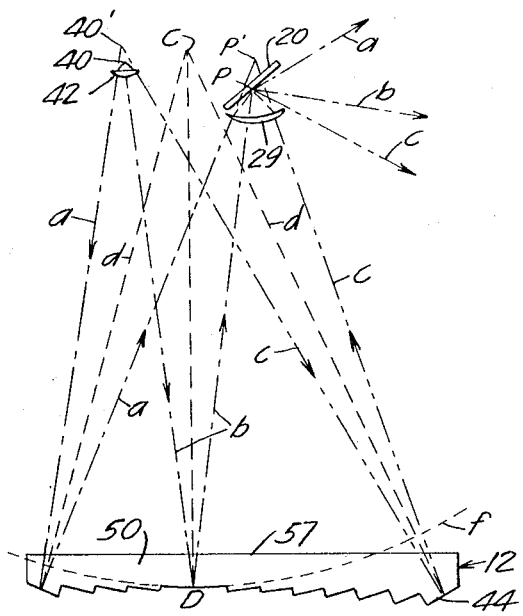
Figure 6:
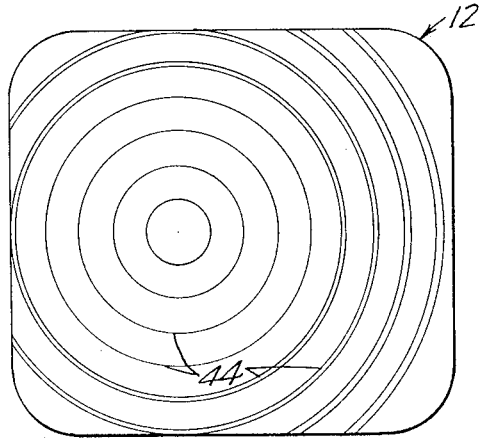
Figure 4:
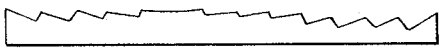
Figure 5:
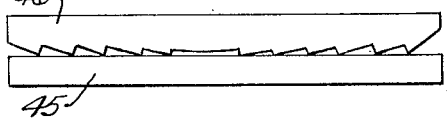
Figure 7:
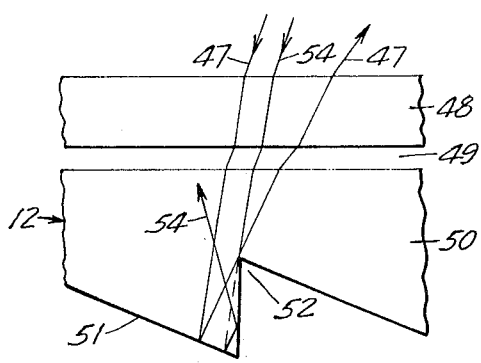
Figure 8:
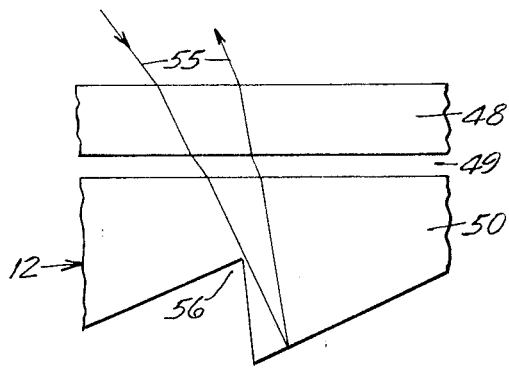

In the drawing:
FIGURE 1 is a view in perspective of an exemplary overhead projector embodying the principles of the invention;
FIGURE 2 is a view in perspective of the light source and projection head unit of the device of FIGURE 1, opened and with portions cut away to show interior detail;
FIGURE 3 is a diagrammatic sketch of the optical components of the projector of FIGURE 1 showing the physical positioning and the path of the light beam;
FIGURES 4 and 5 are diagrammatic cross-sectional views of alternate reflector structures;
FIGURE 6 is a diagrammatic plan view of the reflector of FIGURE 3; and
FIGURES 7 and 8 are diagrammatic sketches on a greatly enlarged scale showing typical paths of light rays to and from the reflector.

The overhead projector 10 of FIGURE 1 consists of a base 11 including a reflector 12 serving as a stage, and a housing 14 supported on a tubular leg 15 through which passes an electric supply cord 16. The housing 14 carries an open-ended honeycomb ventilating section 17 and a focusing knob 18, and includes a lens assembly 19 and mirror assembly 20.

The housing 14 and contents are shown in more detail in FIGURE 2. The box-like housing consists of an open bottom base member 21 and close-fitting cover 22.

A liner 24 within the base 21 supports a socket 25 for a projection lamp 26 centered within the open liner. The liner 24 is open at the front and terminates in a pair of arms 27 for supporting bolts 28 on which mirror assembly 20 is pivotally supported for raising or lowering the position of the projected image on the viewing screen.

The lens assembly 19 includes a converging meniscus lens 29 retained within a frame 30 which terminates in a side arm 31 pivotally supported on a screw 32 attached to the wall of the liner 24. A pin 34 attached to the arm 31 rides in the spiral groove 35 of a cam 36 supported on a shaft 37 passing through the wall of the liner 24 and base 21 and terminating in knob 18. Rotation of the knob 18 will be seen to cause rotation of the cam 36 and to result in vertical movement of the lens 29 so as to permit focusing of the projected image.

The tubular leg 15 is attached to the housing 14 at a rear interior corner. Wire leads 38 from socket 25 are passed through the leg and extend as supply cord 16.

A liner 39 depending from cover 22 encloses the lamp 26 and insulates the other components from the heating effect of the lamp. Heated air rises from the vicinity of the lamp through the open honeycomb 17, permitting dissipation of large amounts of heat without overheating the equipment and without danger to the operator or to the transparency.

The lamp 26 incorporates a high wattage bank of coiled filaments 40 supported between a reflector 41 and a condensing lens 42, to produce an intense cone-shaped beam of light which is directed downwardly through the open bottom of the housing.

The positioning of the several elements and their interaction to produce a projected image is indicated schematically in FIGURE 3. Light from the filament 40 is condensed by the lens 42 and directed to the reflector 12, here indicated in cross-section. The reflective surface 44 is formed of concentric conoidal rings, grossly exaggerated in the drawing for clarity, each representing a segment of a spherical surface having a center of curvature at the point C, each segment being everywhere substantially equidistant from, and retro-reflectively focused on, said point. The cone of light from the filament 40 is thereby reflected to, or very near to, a point P'. The reflected cone, refracted to a point P by the lens 29, is reflected from the mirror 20 to a suitable viewing screen, not shown. The path of light at each of three positions is indicated by broken lines $a$, $b$ and $c$ respectively, the lines $d$ passing through the center C being in each instance perpendicular to the reflective surface at the point of incidence. For simplicity and clarity of explanation the effect of refraction at the surface 57 is ignored in the foregoing discussion but is to be incorporated in known manner in the design of a specific reflector 12.

The reflector 12 as shown in FIGURE 3 consists of a thin transparent sheet material having a smooth flat upper surface 57 and a grooved lower surface 44 which has been rendered reflective, e.g. by vapor or chemical deposition of a reflective metal coating. The flat upper surface serves as a stage for supporting a transparency for projection. It will be apparent that light rays must pass twice through the transparency in order to reach the viewing screen.

The reflector 12 of FIGURE 3 is easily produced by hot pressing with a pre-formed mold, and is conveniently composed of clear transparent hard heat-softenable organic plastic of which polymethyl methacrylate is typical. The upper surface 57 is flat and smooth so that a transparency laid thereon will conform to the surface. The lower reflective grooved surface 44 is protected from abrasion and dust.

The alternative reflector structure illustrated in FIGURE 4 has its reflective grooved surface uppermost, thereby providing first-surface reflection. The ridges between the concentric grooves lie in a common plane and form a planar supporting surface for the transparency, but are therefore subject to abrasion, loss of reflectivity, and deformation. The grooves easily collect dust and dirt so that reflectivity is again reduced. However, the structure serves to reduce to a minimum the spacing between reflector surface and transparency, and is particularly desirable for systems requiring increased enlargement of the projected image. The reflective surface may be supported on, or form a part of, an opaque material, e.g. a polished grooved metal plate.

FIGURE 5 illustrates another alternative reflector structure in which a first-surface plane reflector 45 underlies a transparent grooved refractor 46. The optically active surfaces, which are retro-reflectively focused on a point C as in FIGURE 3, may be completely sealed from external contamination and the upper surface supporting the transparency is flat and smooth as in FIGURE 3. However the depth of the grooves and the total thickness required of the reflector assembly is appreciably greater in this more complex modification than in those of FIGURES 3 and 4.

Essentially the same results are attainable by inverting the refractor 46 of FIGURE 5 and reversing the slope of the individual conical segments, so that light rays from the point C of FIGURE 3 are refracted at the outer grooved surface into a path essentially perpendicular to the plane of the mirror 45, which in this case may be formed directly on the flat lower surface of the refractor. The effect is again to obtain retro-reflective focusing at the point C from each of the optically active segments of the grooved surface. As with the structure of FIGURE 4, the structure just described is subject to abrasion and soiling.

It will be appreciated that the transparencies of which a projection is desired will almost invariably be in the form of thin flat sheets or plates of transparent material on which an image is formed with colored transparent dyes or with opaque inks or by surface etching or in other ways. With these transparencies smooth contact with a flat stage or supporting surface is essential. However, it may be noted that stages of spherical section are capable of performing somewhat the same function with a transparency which is capable of conforming to the said surface. An example would be a design applied directly, as by painting with transparent colored lacquers, to the transparent inner surface of an exteriorly metallized reflective thin spherical section reflector member positioned and shaped as indicated by the dotted line *f* of FIGURE 3.

FIGURE 6 diagrammatically indicates the circular configuration of the concentric reflector segments, and the offset position of the axis. One significant effect of offsetting the center of curvature from the center of the supporting stage is indicated in FIGURES 7 and 8.

FIGURE 7 represents a segment at the left of the axis or center line CD as seen in FIGURE 3. A light ray 47 from source 40 is here shown as passing through a thin transparency 48, an intervening narrow space 49, and the transparent body 50 of the reflector 12. The space 49 is eliminated where full contact between transparency and support is provided. At the reflective surface coating 51 the ray is specularly reflected, in this instance just missing the edge of the next adjacent groove 52, and continuing toward the focal point P′. Another ray 54, following an essentially parallel path, is reflected against the face of the groove 52 and is lost. Thus a significant small proportion of the incident light passing through the transparency at the left of the reflector axis, as viewed in FIGURES 3 and 6, and significantly in the area nearest the source and hence most strongly illuminated, fails to reach the viewing screen.

FIGURE 8 similarly represents a segment at the right of the center line CD. The ray 55 from the source 40, and which just misses the edge of the groove 56, is reflected and returned through the transparency 48 and to the viewing screen; and it will be apparent that all rays on either side of the ray 55 will be similarly reflected and directed.

As a result of the effects just described, it is found that the intensity of illumination obtained at the viewing screen is of a surprisingly high degree of uniformity.

As a further illustration and in terms of a specific embodiment as illustrated in FIGURE 1, the following detailed dimensions of a presently preferred form of an overhead projector embodying the principles of the invention are given. The apparatus is capable of handling the usual 8½ x 11 inch transparencies in either direction and of projecting the image on a 60 x 60 inch screen at a distance of about 70 inches from the projection head, a typical classroom arrangement. Viewed from a distance not less than about 100 inches from the screen, the projected image is found to appear clear and sharp. Colored images are particularly well reproduced on the viewing screen.

The flat smooth-surfaced reflector, serving as the stage for supporting the transparency, has a square outline with rounded corners and measures 10 x 10 inches. The axis of the concentric conoidal rings of the reflector is approximately 2.9 inches from the center of the rear edge. The lamp is suspended above the reflector at a distance such that the filament, i.e. the point 40 in FIGURE 3, is about 13.4 inches above the reflector and above a point about 1.3 inches from the center of the rear edge, bringing the point 40′, the apparent position of the filament, above a point about 1.1 inches from the rear edge and about 14.1 inches above the reflector.

The lens 29 is 3.4 inches in diameter and has a focal length of 10.8 inches. The lowest point of its convex surface is about 12½ inches above the approximate center of the stage when the apparatus is in focus under the conditions described. Under these same conditions, the apparent focus, i.e. the point P′ in FIGURE 3, is found to be about 16¾ inches above the center of the stage, and the real focus, i.e. the point P, at about 15½ inches.

The reflector 12 is a thin sheet of polymethyl methacrylate grooved over the lower surface and coated on the grooved surface with a vapor deposited aluminum reflective metallic coating. The grooves are radially spaced apart a distance of 0.010 inch; i.e. there are about 100 individual useful reflective surfaces per inch of radius of the reflector surface, each of said surfaces being conoidal and all retro-reflectively focused on a common center, in this instance at an inclination to the common axis such that a line drawn from a point C approximately 15.7 inches along the axis to a point on that surface will be substantially perpendicular to that surface at that point, due consideration being given to the effect of refraction at the surface 57. The average thickness of the plastic sheet is about ten mils.

It will be apparent that other specific dimensions may equally well be employed for the same or other purposes. Thus for projecting from much smaller transparencies, such for example as colored positive photographic films, very much smaller stages will be found fully adequate, and other dimensions may then be analogously modified. On the other hand, where larger transparencies are to be used, or where projection to greater distances and on viewing screens of larger areas is desired, still other modifications will be necessary. However the specific dimensions hereinbefore recited have provided overhead projectors which are small and compact, and project exceptionally clear and true images from full office correspondence size transparencies all as herein described; and projectors incorporating these dimensions are presently greatly preferred. For example, placing the light source and the lens and mirror projection assembly closely adjacent each other and on opposite sides of the optical axis CD at approximately the height of the center C permits placing both within a single relatively small housing as in the embodiment of FIGURE 1. Placing the source closer to the reflector necessitates placing the projection assembly at a greater distance, so that under extreme conditions some of the reflected cone or beam of light may be blocked by the source. Again, increasing the distance between source and reflector requires that the projection lens be moved nearer the reflector and, in extreme cases, partially within the cone of light from the source.

The single lens 29 for focusing the projected image on the screen is fully adequate for the class of work ordinarily undertaken with such projection equipment, but it will be appreciated that more complex lens systems may alternatively be used.

The reflector 12 is conveniently supplied as a metallized plastic pressing, prepared by much the same techniques used in the manufacture of pressed disc phonograph records, and fitting within a suitable depression in the base 11 so as to provide a smooth continuous supporting surface. The reflector may alternatively be laid in position on a smooth surfaced base. In a particularly useful modification, a plane mirror is permanently attached to the base and the individual transparencies are each provided with a grooved pattern to form a reflector assembly as indicated in FIGURE 5. The entire reflector may alternatively be formed at the under face of the transparency, e.g. by first hot-pressing the grooved design into the surface of the plastic film and then reflectorizing the grooved surface. Since hot pressing from metallic dies is easily accomplished at high speeds, transparencies with built-in reflectors are economical to produce; and their use still further reduces the cost and complexity of the projector.

Transparencies which include the grooved pattern of the reflector assembly may be further modified so that images or indicia suitable for projection may be placed thereon by either pressure or heat. As an example, a thin thermoplastic transparent film hot pressed on one surface with concentric grooves as described hereinabove is subjected to localized brief intense heating at desired image areas, for example by the thermographic copying process using a differentially radiation-absorptive printed original. The plastic softens and distorts at the heated areas. When the reflectorized film, or the transparent film together with a plane mirror, is now placed beneath the projection head, only the undistorted portions of the grooved surface are capable of directing the incident light to the viewing screen. The image areas therefore appear as dark areas on the lighted screen. Similarly, if the plane mirror is first coated with a thin plastic layer of transparent pressure-sensitive adhesive and the grooved surface of the thin transparency placed thereover, the assembly will reflect light from the source to the projection lens except at such areas as may be subjected to pressure. The pressure, as with a stylus, forces the soft plastic adhesive to flow into and fill the overlying grooves, thus causing the incident light to be directed away from its previous path and resulting in a dark image area at the viewing screen.

What is claimed is as follows:

1. Projection apparatus comprising light source means for directing a beam of light to a stage, a light-reflective stage for supporting a transparency in position to receive and transmit said beam and for re-directing said beam through a said transparency supported thereon and to a projection head, and projection head means for focusing said beam on a viewing screen; said stage comprising a substantially planar grouping of narrow concentric conoidal surfaces of increasing diameter and increasing inclination to a common axis which is offset from the center of said stage, all of said surfaces being focused on a common center on said axis; and said source and said head means being located closely adjacent and on opposite sides of said common center with said head means over the center of the stage.

2. Projection apparatus comprising light source means for directing a beam of light to a stage, a light-reflective stage for receiving said beam and for re-directing it to a projection head, and projection head means for receiving the re-directed beam and for focusing said beam on a viewing screen; said stage comprising a thin flat transparent plate having a smooth flat transparent first surface facing said source and said head means and an opposite circularly grooved surface comprising narrow concentric specularly reflective conoidal surfaces of increasing diameter and increasing inclination to a common axis which is offset from the center of the stage, all of said surfaces being focused on a common center on said axis; said source and said head means being positioned closely adjacent and on opposite sides of said common center, with said head means over the center of the stage.

3. Projection apparatus comprising light source means for directing a beam of light to a stage, a light-reflective stage for receiving said beam and for re-directing it to a projection head, and projection head means for receiving the re-directed beam and for focusing said beam on a viewing screen; said stage comprising a flat plate having a planar circularly grooved surface facing said source and said head means and comprising narrow concentric specularly reflective conoidal surfaces of increasing diameter and increasing inclination to a common axis which is offset from the center of the stage, all of said surfaces being focused on a common center on said axis; said source and said head means being positioned closely adjacent and on opposite sides of said common center, with said head means over the center of the stage.

4. Projection apparatus comprising light source means for directing a beam of light to a stage, a light-reflective stage for receiving said beam and for re-directing it to a projection head, and projection head means for receiving the re-directed beam and for focusing said beam on a viewing screen; said stage comprising a flat specularly reflective mirror and a superposed thin transparent planar refractor having adjacent said mirror a circularly grooved surface comprising narrow concentric conoidal surfaces of increasing diameter and increasing inclination to a common axis which is offset from the center of the stage, all of said surfaces being focused on a common center on said axis, and said refractor having an opposite flat planar surface; said source and said head means being positioned closely adjacent and on opposite sides of said common center, with said head means over the center of the stage.

5. For use in projecting light-images from a thin image-carrying transparent film having a circularly grooved refracting surface, projection apparatus comprising light source means for directing a beam of light to a stage, a flat specular reflector forming a said stage for supporting a said film, and a projection head for receiving a light beam from said stage and for focusing said beam on a viewing screen; said grooved refracting surface comprising narrow concentric conoidal surfaces of increasing diameter and increasing inclination to a common axis, all of said surfaces being focused on a common center on said axis; said projection head being on a line perpendicular to the approximate center of said stage, said head and source being closely adjacent each other and at a distance from said stage approximately equal to the distance between the grooved film and the said common center of focus of said conoidal surfaces.

6. For use in projecting light-images from a thin image-carrying film of transparent plastic material having a circularly grooved reflecting surface, projection apparatus comprising light source means for directing a beam of light to a stage, a flat stage for supporting a said film, and a projection head for receiving a light beam from said stage and for focusing said beam on a viewing screen; said film having a smooth flat transparent first surface, and a circularly grooved opposite surface comprising narrow concentric specularly reflective conoidal surfaces of increasing diameter and increasing inclination to a common axis, all of said surfaces being focused on a common center on said axis; said projection head being on a line perpendicular to said stage at the approximate center thereof, said head and source being closely adjacent each other and at a distance from said stage approximately equal to the length of said common axis between said grooved film and said common center.

7. Projection apparatus as described in claim 6 in which said light source means and said projection head are enclosed within a common compact housing fixedly connected to said stage.

8. A flat-surfaced light-reflecting stage for use in projection apparatus as described in claim 1, said stage having a circularly grooved surface comprising a substantially planar arrangement of narrow concentric conoidal surfaces of increasing diameter and increasing inclination to a common axis which is offset from the center of said stage, all of said surfaces being focused on a common center on said axis.

9. A light-reflecting stage for use in projection apparatus as described in claim 1, said stage having a reflective planar circularly grooved surface comprising narrow concentric specularly reflective conoidal surfaces of increasing diameter and increasing inclination to a common axis which is offset from the center of said stage, all of said surfaces being focused on a common center on said axis.

10. A light-reflecting stage for use in projection apparatus as described in claim 1, said stage including a flat specularly reflective mirror and a superposed thin transparent planar refractor having adjacent said mirror a circularly grooved surface comprising narrow concentric conoidal surfaces of increasing diameter and increasing inclination to a common axis which is offset from the center of the stage, all of said surfaces being focused on a common center on said axis.

11. Projection apparatus as defined in claim 1 and including a compact elongate housing interiorly longitudinally separated into two closely adjacent compartments by an intervening opaque heat shield; one of said compartments having an open bottom, an open mesh top, and enclosing a said light source; the other of said compartments having an open side opposite said one compartment and, extending therethrough, a said projection head comprising a focusing lens assembly and an adjustable mirror; said lens assembly being pivoted at a point near the closed opposite end of said housing for movement toward and away from said mirror; and cam means at a side of said housing for imparting said movement to said lens assembly.

12. A sheet material useful in projecting on a viewing screen a light-image corresponding to a heat pattern impressed on said sheet material and comprising: a thin flexible transparent thermoplastic film softening at temperatures available in the thermographic copying process and having over a surface a pattern of narrow concentric conoidal surfaces of increasing diameter and increasing inclination to a common axis which is offset from the center of the pattern area, all of said surfaces being focused on a common center on said axis, and a reflector surface adjacent one surface of said sheet.

13. A sheet material useful in projecting on a viewing screen a light-image corresponding to a pressure pattern impressed on said sheet material and comprising: a thin transparent flexible sheet having over a surface thereof a pattern of narrow concentric conoidal surfaces of increasing diameter and increasing inclination to a common axis, all of said surfaces being focused on a common center on said axis; a planar reflector closely adjacent the patterned surface of said sheet; and a thin stratum of transparent soft plastic material supported on said reflector and making contact with said patterned surface at the extended edges of said conoidal surfaces, the soft plastic material flowing into the overlying grooves of the patterned surface under localized stylus pressure to provide a corresponding projection image.

References Cited by the Examiner

UNITED STATES PATENTS

| 2,407,680 | 9/1946 | Palmquist et al. | 88—82 |
| 2,495,320 | 1/1950 | Franck | 240—106.1 |
| 2,588,373 | 3/1951 | Erban | 88—28.93 |
| 2,647,437 | 8/1953 | Bentley et al. | 88—27 |
| 2,914,997 | 12/1959 | Grey | 95—42 |
| 2,986,062 | 5/1961 | Willyard | 88—1 |
| 3,051,041 | 8/1962 | Lehmann et al. | 88—26 |
| 3,203,306 | 8/1965 | Lefferts | 88—1 |
| 3,222,986 | 12/1965 | Altman | 88—24 |

FOREIGN PATENTS 1,153,915  4/1964  Germany.

NORTON ANSHER, *Primary Examiner.*

VANCE A. SMITH, *Assistant Examiner.*